M. H. CARRICK.
COMBINATION PLASTER GAGE CORNER AND FURRING STRIP.
APPLICATION FILED OCT. 14, 1914.
1,169,066.
Patented Jan. 18, 1916.
2 SHEETS—SHEET 1.
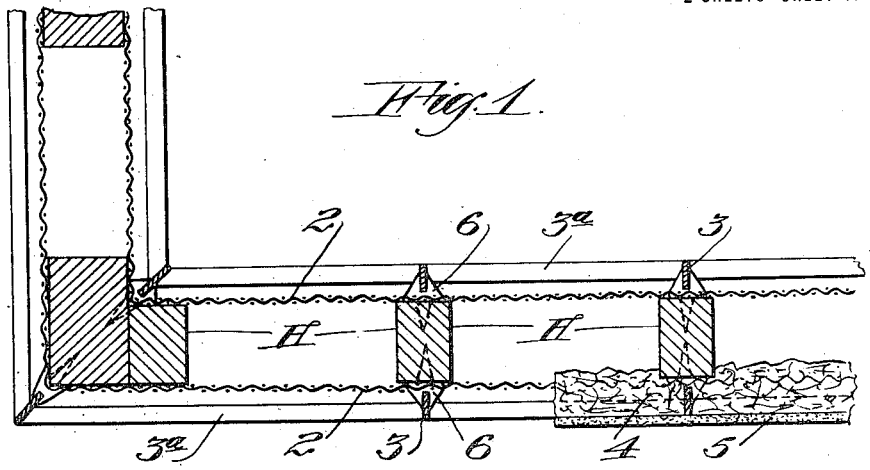
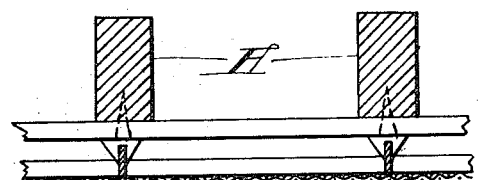
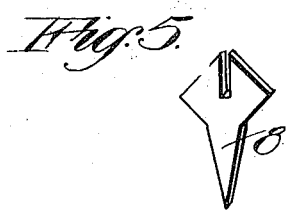
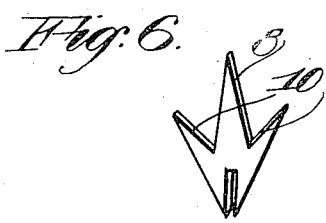
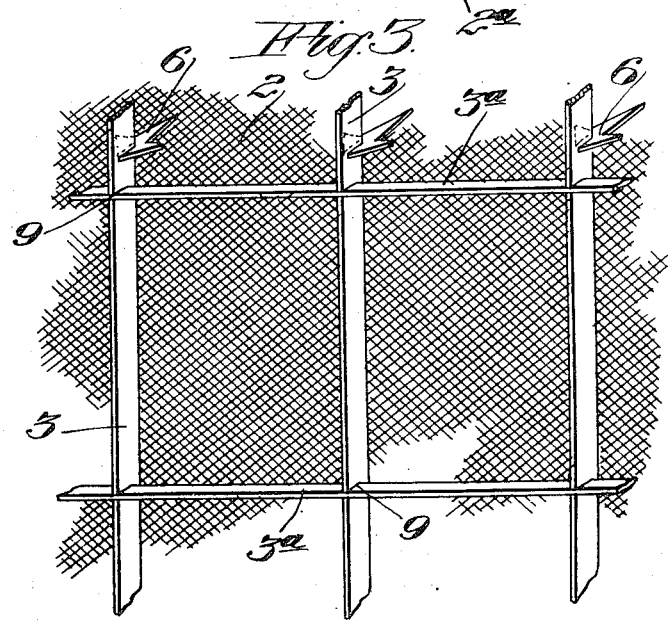
WITNESSES:
Charles Pickles
Thos Castberg
INVENTOR
Martin H. Carrick
BY G. H. Strong
ATTORNEY M. H. CARRICK.
COMBINATION PLASTER GAGE CORNER AND FURRING STRIP.
APPLICATION FILED OCT. 14, 1914.
1,169,066.
Patented Jan. 18, 1916.
2 SHEETS—SHEET 2.
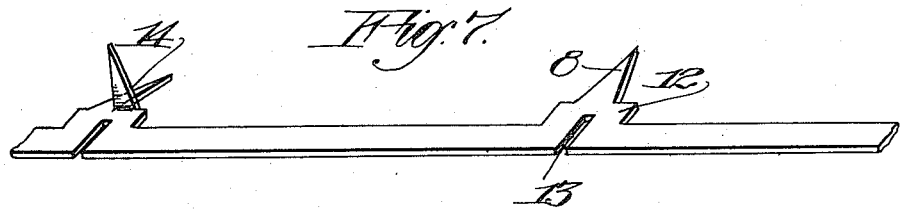
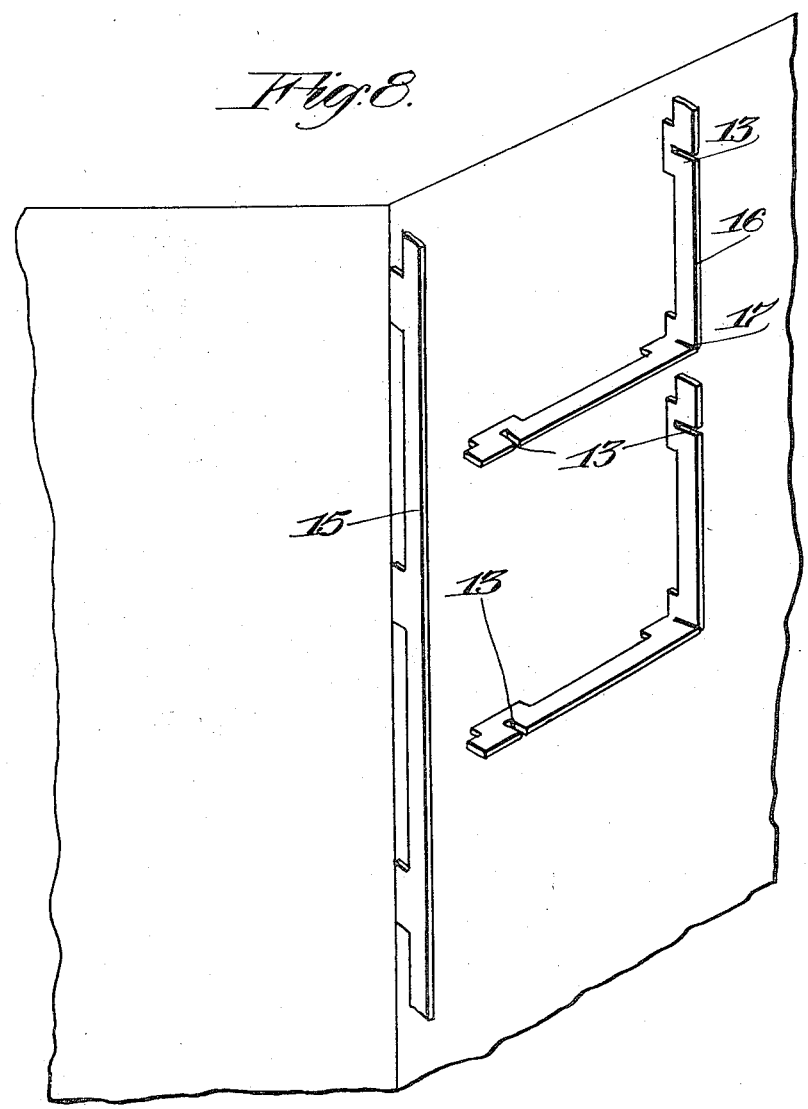

UNITED STATES PATENT OFFICE.

MARTIN H. CARRICK, OF SAN FRANCISCO, CALIFORNIA.

COMBINATION PLASTER-GAGE CORNER AND FURRING STRIP.

1,169,066.   Specification of Letters Patent.   Patented Jan. 18, 1916.

Application filed October 14, 1914. Serial No. 866,614.

*To all whom it may concern:*

Be it known that I, MARTIN H. CARRICK, a citizen of the United States, residing in the city and county of San Francisco and State of California, have invented new and useful Improvements in Combination Plaster-Gage Corner and Furring Strips, of which the following is a specification.

This invention relates to a combination plaster gage corner and furring strip.

It is one of the objects of the present invention to provide a combined plaster gage corner and furring strip which may be secured directly to any form of studding, wall structure or lathed surface to serve either as a gage for the plaster or a furring strip for the laths, or which may be applied to inside or outside corners as a reinforcing strip for same.

Another object of the invention is to provide a novel form of fastening means for the combined gage, corner and furring strip.

Further objects will hereinafter appear.

The invention consists of the parts and the construction and combination of parts as hereinafter more fully described and claimed, having reference to the accompanying drawings, in which—

Figure 1 is a plan section of a wall or partition showing the application of the invention. Fig. 2 shows the device applied as a furring strip. Fig. 3 is a perspective view, showing the strips applied to a lathed surface, as a plaster gage. Fig. 4 shows the form of clip which is used for securing the strips on straight surfaces. Fig. 5 shows the form of clip used on inside corners. Fig. 6 shows the form of clip used on outside corners. Fig. 7 shows a form of strip having the securing means formed integral therewith. Fig. 8 is a perspective showing the application of the form of strip shown in Fig. 7.

More particularly described, A indicates any suitable form of studding and 2 a wire or wood lath secured thereto. Secured to either the laths or studding, both lengthwise and crosswise, as shown in Figs. 1 and 3, is a series of strips 3 and 3ª. These are applied for the purpose of insuring a certain thickness or coating of plaster and also for the purpose of preventing checking or cracking of same to any extent. The first coat of plaster is applied just sufficiently thick to make an even finish with the top of the strips, as indicated at 4, Fig. 1. The finishing coat 5 is then applied and this will completely cover the strips and form a finishing surface.

The strips may be secured directly to the studding by means of the form of spike or clip 6 shown in Fig. 4. This spike is provided with a slotted head 7 and a shank 8 which is adapted to be driven into the studding. The vertical strips 3 are then forced into the slotted head of the spike and may be further secured by squeezing the pointed ends of the head inwardly against the sides of strip 3 by means of a pair of pliers or like tool. The vertical strips are in turn slotted, as indicated at 9, to permit the application of the lengthwise running strips 3ª.

The vertical strips may similarly be applied to inside and outside corners by means of the form of spikes shown in Figs. 5 and 6. The spike shown in Fig. 5 is slotted to receive a vertical reinforcing strip, but the inside edges of the head are preferably cut at such an angle as to fit the inside corners of a wall. The inside edges of the spike shown in Fig. 6 are similarly cut on an angle, as indicated at 10, to fit the outside edges of the wall corner, as shown in Fig. 1. This forms a seat for the spike and limits the inward movement of same when it is being driven into place. A space is also formed in this manner between the vertical strip and the inside or outside corner to form a key for the plaster.

The spikes shown in Figs. 4, 5 and 6 may be used in connection with any suitable form of lath, either wire or wood, as they are sufficiently heavy to be driven through the wood structure of the lath and studding or the meshes of the wire and the studding. The strips may also be used as furring strips, referring to Fig. 2. The same spikes are used and the strips 3 and 3ª are secured to same. The lath is then tied outside of the strips, as indicated at 2ª.

A slight modification of the strip is shown in Fig. 7. The shouldered shank extensions 12 are here formed directly on the strip. This permits the strip to be driven directly onto the studs without the use of the spikes shown in Figs. 4, 5 and 6. The horizontally disposed strips are secured to same, as shown in Fig. 3, by placing them in the slots 13 formed therein.

In some instances where metal studdings and lath are used, it is desirable to split the shank, as indicated at 14. This permits the points to be bent around the studding or the lath for the purpose of securing same when no other means is convenient.

The strips 3 and 3ª do not only form a gage for the plaster, a reinforcing for inside and outside corners, and a furring strip for wall structures, but also serve as a reinforcement and key for the plaster which prevent the same from checking or cracking to any extent.

The materials and finish of the several parts of the device are such as the experience and judgment of the manufacturer may dictate.

I wish it understood that various changes in form, proportions and minor details of construction may be resorted to within the scope of the appended claims and that I do not wish to limit myself to the specific design and construction here shown.

Fig. 8 shows the application of the strip shown in Fig. 7. The strip may be used as a corner strip, as shown at 15, or as a plaster gage, as shown at 16. The strip constructed as here shown may be driven right onto the lath or studding, thus eliminating use of the separate spikes shown in Figs. 4, 5 and 6. By bending the strip into angular sections, as shown at 17, and securing them on a wall, it is possible to eliminate the horizontal strips 3ª. The slots 13 will in this instance act as a plaster key and will thus form a brake in the strip which will prevent the finishing coat from any possible chance of cracking.

Having thus described my invention, what I claim and desire to secure by Letters Patent is—

1. A combination plaster gage corner and furring strip comprising a metal strip having slots formed in one edge, shouldered projections formed at intervals along the other edge, and a spike-like extension on each of said shouldered projections.

2. In a device of the class described, a supporting device composed of an integral head and shank, the shank being sharpened to enable driving thereof into a wall structure or the like and the base of the head forming shoulders which engage the wall structure and both limit the extent of movement into said structure and when engaged with the latter bracing the entire device, said heads having approximately central slots in their driving ends adapted to receive furring strips.

3. A device of the class described comprising a plurality of supporting devices, each consisting of a tapered shank and triangular shaped head formed integral therewith to provide shoulders upon opposite sides of the shank and at the base of the head, said head having a slot alined with the shank, said shanks being adapted to be driven into a wall structure so that said shoulders engage the wall structure, and brace the heads, and a metal strip extending through and secured in the slots of the heads.

In testimony whereof I have hereunto set my hand in the presence of two subscribing witnesses.

MARTIN H. CARRICK.

Witnesses:
JOHN H. HERRING,
W. W. HEALEY.